US010207365B2

(12) United States Patent
Chen et al.

(10) Patent No.: US 10,207,365 B2
(45) Date of Patent: Feb. 19, 2019

(54) PARALLEL LASER MANUFACTURING SYSTEM AND METHOD

(71) Applicant: The Chinese University of Hong Kong, Hong Kong (CN)

(72) Inventors: Shih-Chi Chen, Hong Kong (CN); Dapeng Zhang, Hong Kong (CN); Chenglin Gu, Hong Kong (CN); Jun Jiang, Hong Kong (CN); Yam Yeung, Hong Kong (CN)

(73) Assignee: THE CHINESE UNIVERSITY OF HONG KONG, Hong Kong (CN)

( * ) Notice: Subject to any disclaimer, the term of this patent is extended or adjusted under 35 U.S.C. 154(b) by 967 days.

(21) Appl. No.: 14/594,871

(22) Filed: Jan. 12, 2015

(65) Prior Publication Data

US 2016/0199935 A1    Jul. 14, 2016

(51) Int. Cl.
*B23K 26/00* (2014.01)
*B23K 26/06* (2014.01)
(Continued)

(52) U.S. Cl.
CPC ...... *B23K 26/0643* (2013.01); *B23K 26/0624* (2015.10); *G02B 26/0833* (2013.01); *G02B 27/285* (2013.01)

(58) Field of Classification Search
CPC ............ B23K 26/06; B23K 26/0624; B23K 26/0643; B23K 26/066; G02B 26/0833; G02B 27/285
See application file for complete search history.

(56) References Cited

U.S. PATENT DOCUMENTS 6,394,999 B1 * 5/2002 Williams ............ A61F 9/00806
128/898
2008/0151238 A1 6/2008 Zhu et al.
(Continued)

FOREIGN PATENT DOCUMENTS

WO   WO 2012/135823 A1   10/2012
WO   WO 2012135823 A1 * 10/2012   ......... A61B 1/00163

OTHER PUBLICATIONS

Durst et al.; Simultaneous Spatial and Temporal Focusing in Nonlinear Microscopy; NIH Public Access Author Manuscript, Apr. 1, 2008, 281(7): 1796-1805.
(Continued)

*Primary Examiner* — Dana Ross
*Assistant Examiner* — Brandon Harvey
(74) *Attorney, Agent, or Firm* — Knobbe Martens Olson & Bear LLP (57) ABSTRACT

A laser manufacturing system capable of fabricating 3-D resolved 2-D patterns. The system includes a pulse laser source generating a laser beam; a reflectance mirror arranged in the propagation path of the laser to reflect the laser, the mirror being controllable to adjust an emergent angle of the laser; a deformable dispersion unit located in the laser receiving path from the reflectance mirror and having an array of micromirrors controllable in response to the adjusted emergent angle to form required laser patterns from the reflected laser, the laser patterns having spatially separated optical spectral components with multiple propagation angles; and one or more focusing optical components positioned in the propagation path of the separated optical spectral components produced by the deformable dispersion unit; the focusing components recombine the optical spectral components at fabrication targets with patterns defined by the deformable dispersion unit. The laser pulse duration is
(Continued)

shortest on or inside the fabrication target along the laser propagation path.

22 Claims, 9 Drawing Sheets

(51) Int. Cl.
  *G02B 26/08* (2006.01)
  *G02B 27/28* (2006.01)
  *B23K 26/0622* (2014.01)

(56) References Cited

U.S. PATENT DOCUMENTS

| | | | |
|---|---|---|---|
| 2009/0278058 A1 | 11/2009 | Kim et al. | |
| 2010/0097594 A1* | 4/2010 | Cho | B01J 19/0046 355/71 |
| 2014/0098349 A1* | 4/2014 | Nagasawa | G03B 21/2033 353/31 |
| 2014/0128743 A1 | 5/2014 | Yew et al. | |

OTHER PUBLICATIONS

Oron et al.; Scanningless depth-resolved microscopy; Optics Express, Mar. 7, 2005; vol. 13, No. 5; 1468-1476.

Zhu et al.; Simultaneous spatial and temporal focusing of femtosecond pulses; Optics Express, Mar. 21, 2005, vol. 13, No. 6; 2153-2159.

Cheng et al.; Spatiotemporal focusing-based widefield multiphoton microscopy for fast optical sectioning; Optics Express Apr. 9, 2012; vol. 20 No. 8, 8939-8948.

Li et al.; Fast multiphoton microfabrication of freeform polymer microstructures by spatiotemporal focusing and patterned excitation; Optics Express, Aug. 13, 2012 vol. 20 No. 17; 19030-19038.

Tal et al.; Improved depth resolution in video-rate line-scanning multiphoton microscopy using temporal focusing; Optics Letters, Jul. 1, 2005; vol. 30, No. 13 1686-1688.

* cited by examiner

PARALLEL LASER MANUFACTURING SYSTEM AND METHOD

TECHNICAL FIELD

The present application relates to a pulse laser manufacturing system and a pulse laser manufacturing method.

BACKGROUND

Laser manufacturing has become a critical machining process due to its capability to create complex shapes/structures versus conventional methods. With the advent of ultrashort pulse laser technology, i.e. pulse duration less than 100 fs, more complex and sophisticated machining processes can be realized on a broader array of materials, e.g. large band-gap materials, high reflectivity material or ceramics. However, the present laser manufacturing approach is mainly based on point-scanning the focal point of a laser which will sequentially and inherently makes process slow. In addition, the point-scanning process cannot be expedited by increasing the laser power as the resolution will be compromised with thermal effects, e.g. melting and redeposition. Other methods, e.g. laser projection, trade resolution for throughput. Consequently, ultrashort pulse lasers, though highly capable, are mainly used for prototyping and fundamental research.

Recent research shows that the temporal focusing technique could significantly improve the throughput of freeform microstructure manufacturing in polymer. This technique achieves its 3D sectioning capability by regulating the laser pulse width such that it is minimized only at the focal plane, and unlike conventional point-scanning method, temporal focusing fabrication directly projects the widefield excitation pattern on the focal plane through a diffraction component and an objective, thus significantly increasing the yield. However, projection through a diffraction component will sacrifice the resolution. And in manufacturing, it is also highly desired that large-area patterns can be simultaneously fabricated on metals via laser, an ability that has not been demonstrated using temporal focusing.

SUMMARY

This invention presents a new temporal focusing laser fabrication system (TFLFS) by adopting a digital micromirror device (DMD), which simultaneously serves as a diffraction grating, a programmable photomask, and an arbitrary beam-shaper, for direct area patterning. This compact system offers many novel functions for laser manufacturing including at least one of: (1) depth-resolved micro- and nano-fabrication on both transparent and opaque materials; (2) digital micromirror device-based arbitrary beam shaping; (3) phase and group velocity dispersion control capability, i.e. pulse shaping; (4) group velocity dispersion-enabled high-speed Z-scanning; and (5) parallel fabrication of sub-diffraction limit patterns with ablation control. The TFLFS substantially increases the throughput and precision of the ultrashort laser processes without compromising the patterning resolution. This scalable technology may lead to the development of a new parallel laser nano-manufacturing system of industrial scale, e.g. rapid area patterning of 12" wafers, with submicron resolution.

In one aspect of the present application, disclosed is a laser manufacturing system, comprising: a pulse laser source generating a laser beam and a reflectance mirror arranged in the propagation path of the laser to reflect the laser, the mirror being controllable to adjust the direction of the laser beam. The system may further comprise a deformable dispersion unit and one or more focusing optical units. The deformable dispersion unit is located in the laser receiving path from the reflectance mirror and has an array of micromirrors controllable in response to the adjusted emergent angle to form required laser patterns from the reflected laser, the laser patterns having spatially separated optical spectral components with a plurality of propagation angles. The focusing components recombine the optical spectral components at fabrication targets with patterns defined by the deformable dispersion unit. The laser pulse duration is shortest on or inside the fabrication target along the laser propagation path.

In another aspect of the present application, disclosed is a laser manufacturing method, comprising: generating a laser beam; adjusting an emergent angle of the laser beam; forming required laser patterns from the laser in response to the adjusted emergent angle, the laser patterns having spatially separated optical spectral components with a plurality of propagation angles; collimating the optical spectral components into a parallel laser beam; and focusing the laser to a light sheet at the focal plane, where a pulse duration of the laser beam is shortest, to pattern one or more samples located on the focal plane.

In one embodiment of the present application, each of the micromirrors has at least one pixel, and laser intensity in each pixel is controllable by changing a switching (on-off) rate of each pixel, allowing more complex beam intensity profile to be engineered. A switching speed of each pixel in individual micromirror in the deformable dispersion unit is controllable to arbitrarily adjust an intensity profile across laser patterns formed by the deformable dispersion unit.

In one embodiment of the present application, the system further comprises a group velocity dispersion (GVD) controller having a dispersive optical unit or array electrically configurable to spatially adjust the dispersion level for said spatially separated optical spectral components, so as to control the location of the focal plane where all the optical spectral components meet along the optical axis. To be specific, the dispersive optical unit adjusts a relative optical path difference and a phase of the incoming laser beam so as to adjust said dispersion level.

In one embodiment of the present application, the focal length of the focal units is re-configurable to make a duration of laser pulses vary along its propagation direction after the focal units to achieve a highest peak power at different focal planes. The focus of the second (i.e. objective) lens is re-configurable to scan the required patterns formed by the deformable dispersion unit along its propagation direction after the second lens achieving the highest peak power only at the focal plane.

BRIEF DESCRIPTION OF THE DRAWING

Exemplary non-limiting embodiments of the present invention are described below with reference to the attached drawings. The drawings are illustrative and generally not to an exact scale. The same or similar units on different figures are referenced with the same reference numbers.

DETAILED DESCRIPTION

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations have not been described in detail in order not to unnecessarily obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, units, and/or components, but do not preclude the presence or addition of one or more other features, integers, steps, operations, units, components, and/or groups thereof.

It is further understood that the use of relational terms such as first and second, and the like, if any, are used solely to distinguish one from another entity, item, or action without necessarily requiring or implying any actual such relationship or order between such entities, items or actions.

Figure 1:
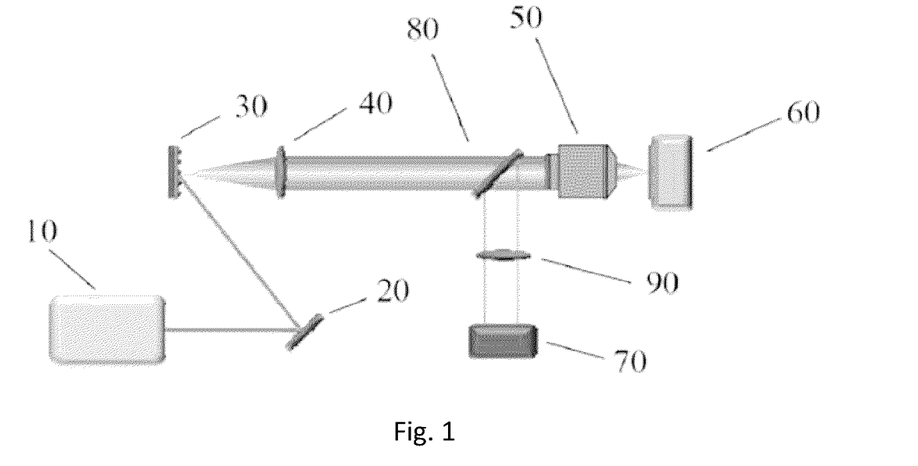
FIG. 1 is a schematic diagram illustrating a typical system for the temporal focusing of a spectrally separated laser pulse.
Figure 2:
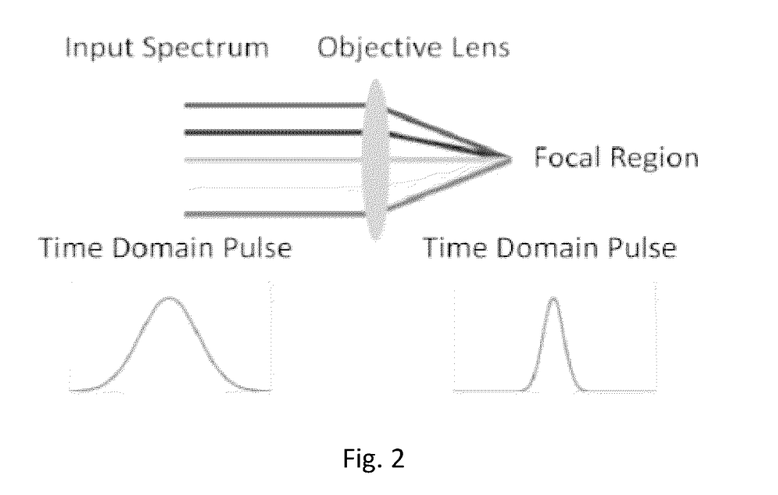
FIG. 2 exemplarily illustrates the working principle of the temporal focusing setup for the laser manufacturing system

FIG. 1 is a schematic diagram illustrating a typical system for the temporal focusing of a spectrally separated laser pulse. FIG. 2 exemplarily illustrates the working principle of the temporal focusing setup for the laser manufacturing system 100. The laser manufacturing system 100 as shown may be used for temporal focusing of pulsed laser to perform manufacturing or machining, such as laser engraving micro-/nano-structures on mental, semiconductor materials, etc. Temporal focusing is achieved by spatially separating optical spectral components in the laser pulses and then recombines these components with focusing lens, e.g. objective lens. The duration of laser pulses are varied along its propagation direction after the focusing lens. And the shortest pulse duration only occurs at the focal plane of the focusing lens. Hence, the laser manufacturing/machining is spatially confined at this region.

As shown in FIG. 1, the system 100 may comprise a light source 10, which may be embodied as a pulsed laser source. As well known in the art, the conventional regen laser amp usually outputs the laser with the wavelength of 800 nm. The system 100 works for different wavelengths. Output frequency maybe doubled or tripled by using second/third harmonic optical kit, but the overall power can be reduced substantially. The generated laser shall have a reasonable repetition rate or reasonable repetition rates (e.g. 1 kHz-100 kHz) and ultrashort pulse duration (e.g. 50-500 fs) to avoid the heat accumulation. For example, the generated laser may have a repetition rate of 1 kHz with 100 fs pulse width and 4 mJ pulse energy. An alternative light source for two-photon polymerization processes may comprise a tunable Ti: sapphire laser.

A high reflectance mirror 20 is arranged in the propagation path of the laser and reflects the laser to a DMD (digital micromirror device) 30. The high reflectance mirror 20 is used to adjust the incident angle of the laser with respect to the DMD 30.

The DMD 30 receives the laser reflected from the mirror 20 and spatially separate optical spectral components in the laser pulses, and then transmits out each of the separated optical spectral components in a plurality of propagation angles. A typical DMD 30 may comprise an array of (e.g., 1024×768, or 4096×2160 or the like) micromirrors. Each micromirror has a very small diameter (e.g., 7 to 10 micron) and can be individually programmed to reflect (or direct) light. The light may be reflected at the speed of 8 kHz or higher according to one embodiment of the present application but the claimed solutions are not limited to this. It shall be appreciated that laser patterns are formed by the programmable micromirror array on the DMD 30, which can be arbitrarily specified, by a user through a computer. The application program interface for controlling the DMD 30 is provided by the DMD provider. Accordingly, by controlling the array of pixels in the DMD 30 in response to the different incident angle to the DMD 30, one can form arbitrary patterns with different grating groove frequency, e.g. 600-1200 lines/mm. Accordingly, DMD 30 can be used as diffractive component and separate different wavelength (spectral components) into different angles.

After the DMD 30, the laser spectrum is spatially dispersed with different propagation angles. The lens 40 is positioned in the propagation path of the separated optical spectral components. The lens 40 have an adjustable or fixed focus that is enable to collimate the optical spectral components with different propagation angles into a parallel laser beam.

As shown, the laser manufacturing system 100 further comprises a focusing lens 50 in the transmitting path of the parallel laser beam. The focusing lens 50 may be an objective lens that has a focus adjustable to recombine these components with focusing lens to pattern the samples on the XYZ stage 60. Since the patterning resolution highly depends on the numerical aperture (NA) of the objective lens, a 40× long working distance water immersion objective lens may be used for high resolution patterning as an example. For large field patterning, a 25× long working distance water immersion lens will be used as an example. The duration of laser pulses are varied along its propagation direction after the focusing lens 50. As the energy contained in each pulse is constant, when the pulse duration varied along the propagation direction, the peak power of the laser pulse will be varied. As a result, only at the focal plane, the highest peak power will be achieved and thus enables 3-D resolved direct area patterning. (Note that laser fabrication will only occurs when the peak power is higher than certain threshold value.)

After the lens 50, the shortest pulse duration only occurs at the focal plane of the lens 50. Hence, the laser manufacturing/machining is temporally confined at this region. FIG. 2 shows the temporal focusing of a spectrally separated laser pulse, in which the time domain pulses before and after the objective lens are also illustrated. The samples located on an XYZ stage 60 will be positioned in this region for patterning. The samples may comprise, for example, large bandgap materials, high reflectivity material, ceramics, biological tissues, or nickel and silicon substrates or the like. With the recombined laser, various desirable preliminary patterns will be formed in the sample. It shall be appreciated that arbitrary patterns may be formed by the programmable micromirror array on the DMD 30 as discussed in the above, which can be arbitrarily specified by a user through a computer.

As shown in FIG. 1, the laser manufacturing system 100 further comprises a monitoring subsystem comprising a CCD 70, a dichroic mirror 80 and a lens 90. The lens 90 is used to focus the beam and/or adjust the beam size. The dichroic mirror 80, i.e. frequency selective mirror, is used to guide the image from the sample to CCD 70. The CCD 70 is used to observe and document the real time fabrication images in situ.

Figure 3:
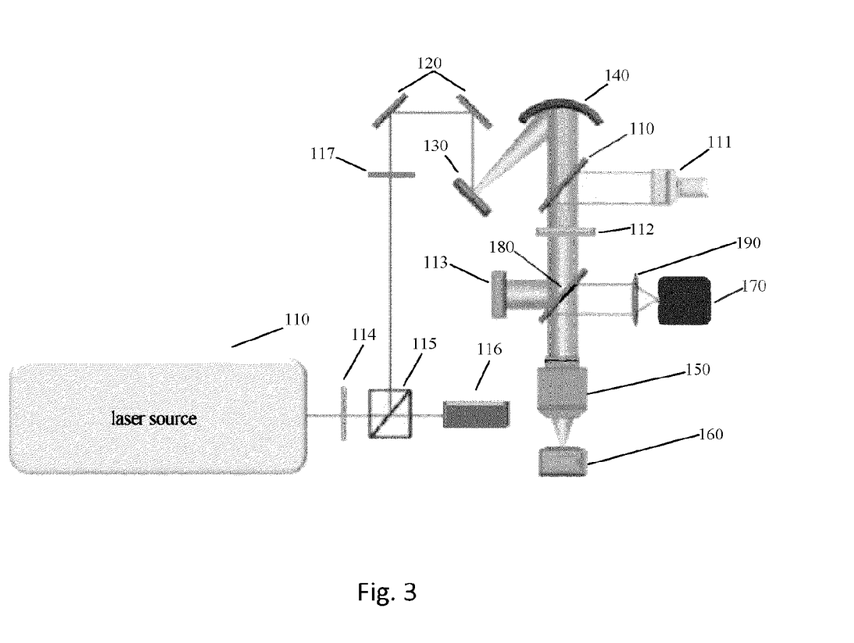
FIG. 3 is a schematic diagram illustrating the laser manufacturing system 1000 according to an embodiment of the present application.

FIG. 3 is a schematic diagram illustrating the laser manufacturing system 1000 according to an embodiment of the present application. As shown in FIG. 3, the laser manufacturing system 1000 may comprise a laser amplifier 110. The laser amplifier 110, as a main light source of the system 1000, may be a regenerative femtosecond Ti: sapphire laser amplifier (e.g. Spectra-Physics, Spitfire Pro) with a predetermined center wavelength. As well known in the art, the conventional regen laser amp usually outputs the laser with the wavelength of 800 nm. The system 1000 works for different wavelengths. Output frequency maybe doubled or tripled by using second/third harmonic optical kit, but the overall power can be reduced substantially. The laser amplifier 110 is configured to generate such a laser that is capable of avoiding the heat accumulation. To this end, the generated laser shall have a low repetition rate and ultrashort pulse width. For example, the generated laser may have a repetition rate of 1 kHz with 100 fs pulse width and 4 W average power. An alternative light source for two-photon polymerization processes may comprise a tunable Ti: sapphire laser.

A half-wave plate 114 is positioned in the propagation way of the generated laser and is used to shift the phase between two perpendicular polarization components of the generated laser so as to retards one polarization of the two perpendicular polarization by half a wavelength, or 180 degrees. This type of waveplate changes the polarization direction of linear polarized light.

A polarization beam splitter 115 is used to adjust the output laser power. In particular, the beam splitter 115 is located in the propagation way of the laser received from the half-wave plate 114. The polarization beam splitter 115 splits the laser received from the half-wave plate 114 into two laser beams, one is parallel to input beam along a first direction (hereinafter x-axis direction), and the other one is orthogonal to the input beam along a second direction (hereinafter y-axis direction). The total power of the two laser beams is equal to the power of the incident laser beam. Hence, the laser power of each output beam from the beam splitter 115 can be freely controlled. An autocorrelator 116 is used to receive one of the separated beams and monitor the pulse duration and quality from the received p-polarized beam.

A shutter 117 is positioned in the propagation way of the beam along y-axis direction. The shutter 117 not only provides extra safety measure but also provides the capability to rapidly switching on/off the laser system. No laser enters the fabrication light path without turning on the shutter. (Turning on/off the regen laser amplifier can be time-consuming, e.g. 1 hr.)

A pair of HRs120 is arranged in the propagation path of the laser and reflects the laser beam to a deformable dispersion unit 130. The two HRs are used to control the incident angle of the laser beam with respect to the deformable dispersion unit. The incident angle is critical as it determines the diffraction order of laser beam to be used in the fabrication progress.

In function, the deformable dispersion unit 130 may be a digital micromirror device (DMD), a microelectromechanical system (MEMS) mirror array, a photomask with grating structures, or a shaped transmission or reflectance grating.

Figure 4:
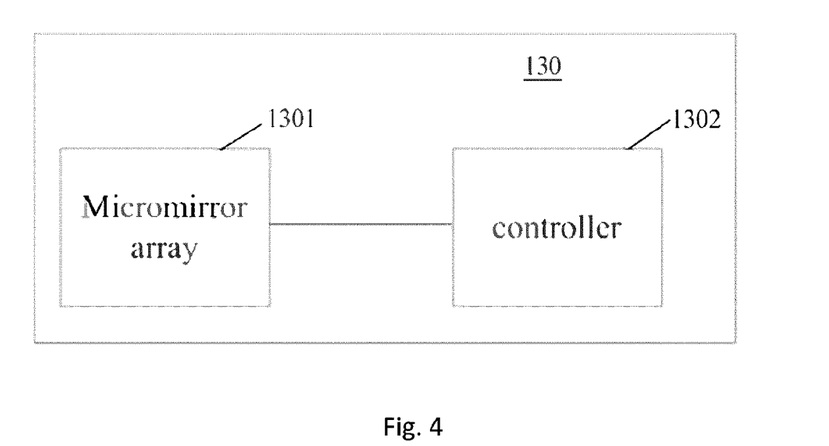
FIG. 4 is a schematic diagram illustrating the functional models of the digital micromirror device (DMD) according to the embodiments of the present application.

The deformable dispersion unit 130 may comprises a DMD with the programmable micromirror array. The laser patterns are formed by the programmable micromirror array on the DMD, which can be arbitrarily specified by an end user. In implementation, as shown in FIG. 4, the deformable dispersion unit 130 may comprise an array of highly reflective micromirrors 1301 and a DMD controller 1302. The highly reflective micromirrors 1301 may be formed as MEMS mirror array, and may comprise an array of (e.g., 1024×768, or 4096×2160 or the like) micromirrors. Each micromirror has a very small size (for example, 7 to 10 micron in size) and can be individually controlled to rotate so as to reflect (or direct) light with required emergent angle. In one embodiment of the present application, the array of micromirrors 1301 is fixed on hidden yokes. The yoke is connected to a reverse hinge structure to allow the micromirror to be rotated at a determined degree, so as to enables the micromirror array to manipulate the spectral components in the laser pulses and thus to enable the micromirror array 1301 to form arbitrary patterns.

In general, a uniform laser intensity profile leads to even laser treatment of the working surface; this is particularly important for direct area patterning. Although the depth-resolved temporal focusing technique is less sensitive to laser uniformity when compared with the projection method, uniform intensity can still be critical when the threshold fluence is applied "over an area" for fabricating sub-diffraction limit features. To achieve this goal, the deformable dispersion unit 130 is used for precision beam-shaping and simultaneously used as a programmable photomask and a diffraction grating. In this approach, the laser spot will be projected onto the deformable dispersion unit 130 and the intensity in each pixel can then be precisely controlled by changing the on-off rate (switching rate) of each pixel in the micromirror 1301, which has a bandwidth of 8 kHz (for example). Accordingly, this method allows more complex beam intensity profile to be engineered. Compared with conventional flat top beam shapers, which consists of refractive/diffractive optical units, the DMD concept offers better precision and flexibility (e.g. arbitrary intensity profile), more importantly, can work with a wide range of wavelengths. To use the DMD 130 with the laser amplifier 110, the pulse trains will be synchronized with the DMD 130 on-off sequence for precise intensity and dose control. This is, however, not necessary for high repetition rate pulse lasers (the alternative laser source).

Figure 5:
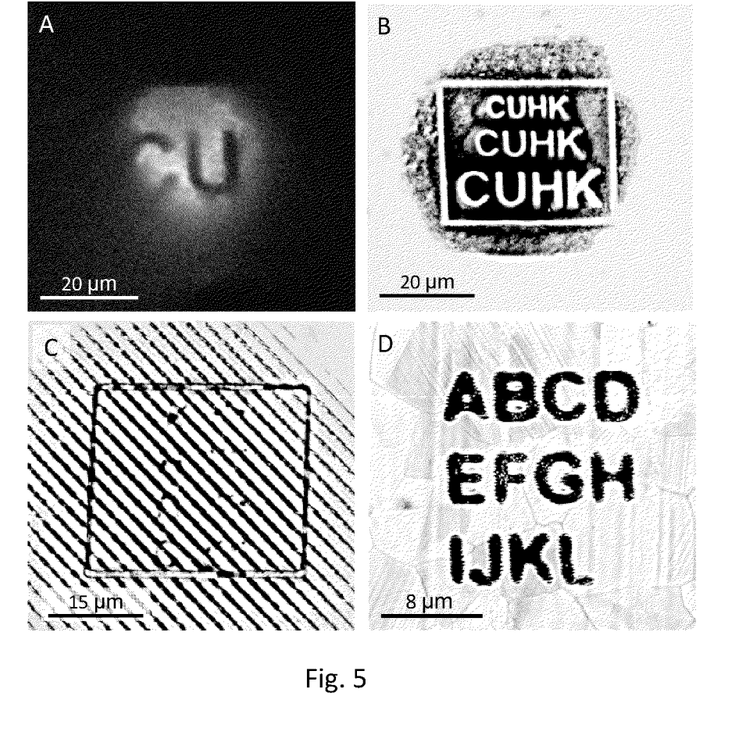
FIG. 5 exemplarily illustrates an optical image, wherein the view identified by "A" shows a "CU" pattern written directly within a pollen sample, and the views identified by "B", "C" and "D" show direct area patterning results on silicon (B, C) and nickel (D) targets, demonstrating close to diffraction limit resolution. The dark indent in B shows the processing area (~50×50 $\mu m^2$).
Figure 6:
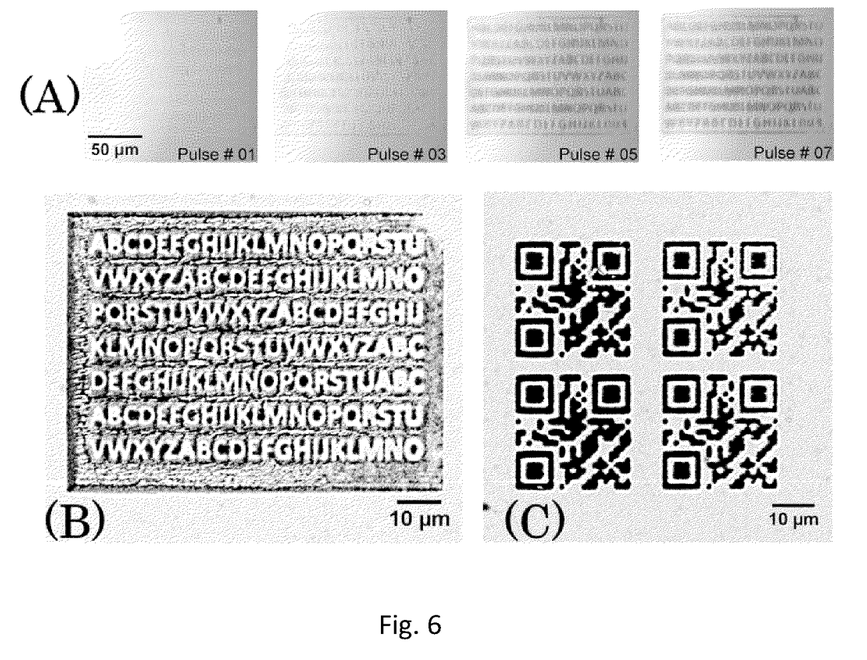
FIG. 6 exemplarily illustrates a patterning sequence, in which view A shows a pulse-by-pulse area patterning sequence on silicon substrate demonstrating direct area patterning process; view B shows Alphabets patterned within a 80×60 $\mu m^2$ box within 10 milliseconds; view C shows TFLFS pattered QR code encoded with "CU".

The resolution limit can be enhanced by controlling the ablation threshold for direct area patterning. Sub-diffraction patterning can be achieved by precisely controlling the incident power intensity profile. The key is to control it over a large patterning area with good uniformity. The ablation threshold values are different for different materials. Laser intensity profile may be precisely adjusted at different regions through DMD 130 to achieve optimal resolution over the entire patterning area. The controller 1302 may control the scanning rate of individual micromirror in the DMD 130 to adjust intensity of the laser forming the patterns. For the point-scanning system, it has been shown that a pit of 300 nm diameter and a depth of 52 nm was micromachined through ablation control using an 800 nm femtosecond laser of a spot size around 3 μm. This is achieved by controlling the center of the Gaussian shaped pulse (it shall be understood that all laser beams have a Gaussian profile to be just above the threshold fluence for ablation. If the same resolution can be demonstrated using the temporal focusing technique, which is theoretically feasible, it will mean the throughput can be substantially increased by 100,000-1000,000 times. FIG. 5 and FIG. 6 show various preliminary patterning results using the temporal focusing and DMD-based laser manufacturing system on biological tissues as well as nickel and silicon substrates.

After the DMD 130, the laser spectrum is spatially dispersed to different propagation angles and then transmits to a concave mirror 140. The concave mirror 140 has an adjustable or fixed focus that is enable to collimate the optical spectral components with different angles of departure into a parallel laser beam.

An objective lens 150 is located in the propagation path of the parallel laser beam. The objective lens 150 recombines these components. The duration of laser pulses are varied along its propagation direction after the focusing lens. As the energy contained in each pulse is constant, when the pulse duration varied along the propagation direction, the peak power of the laser pulse will be varied. As a result, only at the focal plane, the highest peak power will be achieved and thus enables 3-D resolved direct area patterning. Temporal focusing is thus achieved at the focal plane of the objective lens 150 as a thin light sheet (for example, 3-5 μm). The spectral components diverge again after leaving the objective's focal plane. In other words, ultrashort pulses only retain the narrow 100 fs pulse width at the focal plane of the objective lens and broadened everywhere else (that is, the duration of laser pulses are varied along its propagation direction after the focusing lens), thereby achieving depth discrimination. To be specific, only a thin light sheet will meet the requirement that the peak power exceeds the fabrication threshold; then, only materials in this light sheet will be patterned. Hence, the fabrication is depth resolved. Since patterning resolution highly depends on the numerical aperture (NA) of the objective lens, high NA objectives are used for high resolution patterning.

To observe the laser machining process in real time, a microscopic imaging system 2000 is built in conjunction with the manufacturing station. As shown in FIG. 3, the microscopic imaging system 2000 comprises an epi-illumination light source 111 and a long-pass dichroic mirror 110. The long-pass dichroic mirror 110 is positioned in the propagation way of the laser from the concave mirror 140 to the objective lens 150 and the epi-illumination light source 111 is coupled into the optical path by reflectance through a long-pass dichroic mirror for illumination. The characteristic of the dichroic mirror 110 is determined by wavelengths. Infrared laser will transmit through 110, and visible light, the epi-illumination light source 111, will be reflected by the dichroic mirror. As the laser source 111 is infrared and the illumination light is visible, they are combined by the dichroic mirror to the same beam path.

As shown, the microscopic imaging system 2000 further comprises a group velocity dispersion (GVD) control unit 112 configured to implement the high-speed Z-scanning through GVD control. To achieve submicron 3-D machining, one major issue to address is to move the sample with nanometer precision at desired velocities without unwanted dynamics. This difficult problem may be entirely resolved by performing the Z-scanning through controlling the GVD.

In one embodiment of the present application, high-speed Z-scanning through GVD control was achieved by adjusting the internal grating pair of the regenerative laser amplifier 110.

In other embodiment of the present application, the GVD control unit 112 comprises an electrical controllable dispersive optical unit or array that can be used to spatially adjust the level of dispersion (i.e. relative optical path difference and phase of the incoming laser beam. Through controlling the GVD, the location of focal plane (where all frequency components meet after object lens 150) can be controlled along the optical axis. Using this approach, high speed Z positioning of the sample can be achieved without the need of a mechanical stage, which is slow and comes with unwanted dynamics.

Compared with mechanically moving the sample stage, the GVD induced Z-scanning shows comparable axial resolution within 10s micron range. To this end, for example, an Acousto-Optic Deflector (AOD) or DMD Based GVD control unit 112 allows better speed (10 kHz) and precision (vs. adjusting the grating pair in 110). The AOD based GVD control unit 112 will be driven by an RF arbitrary wave generator to control the dispersion of the femtosecond laser pulse. (DBP System will be described in later sections.) Accordingly, 3-D laser micro-machining can be achieved without any mechanical scanning procedures.

The system 2000 further comprises a BS 180, a lens 190, an EMCCD 170, and a power meter 113. System 2000 is a typical reflectance microscope. The illumination light is guided to the sample by the dichroic mirror and the objective lens. Then, the target is illuminated. The reflectance image of the target is firstly formed by the objective lens with certain magnification (e.g. 20× or 60×). And the reflectance image of the target is reflected again by the BS 180 to the CCD 170, the zoom lens 190 resizes the reflected image and finally the CCD 170 collects the image and as a digital picture which can be displayed and recorded with a computer. As the BS 180 is a half mirror (50% light reflected and 50% light transmitted after the half mirror), 50% laser power will be guided to the direction of power meter 113. The power meter can measure the value of the fabrication laser power propagating into the objective lens. Hence, it can be used to monitor the fabrication laser power.

Figure 7:
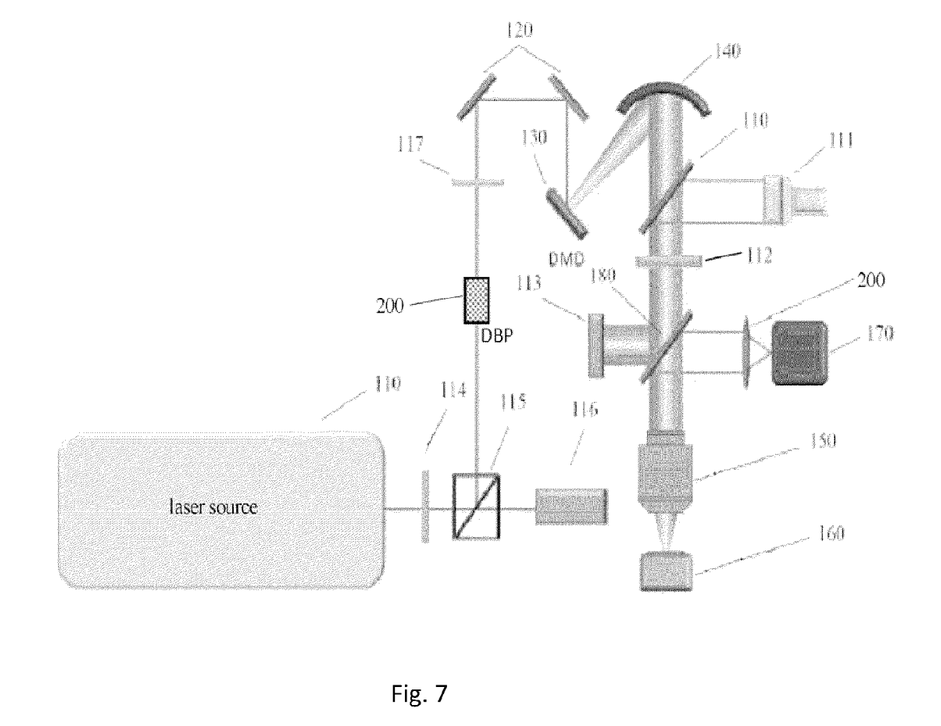
FIG. 7 is a schematic diagram illustrating the laser manufacturing system 1000 according to a third embodiment of the present application.

FIG. 7 is a schematic diagram illustrating the laser manufacturing system 3000 consistent with a further embodiment of the present application.

As shown in FIG. 7, the difference of the system 3000 from the system 1000 as shown in FIG. 3 lies in that a DMD Based Pulse Shaping (DBP) system 200 is positioned in the propagation path of the laser from the polarization beam splitter 115 to the pair of HRs120.

Figure 8:
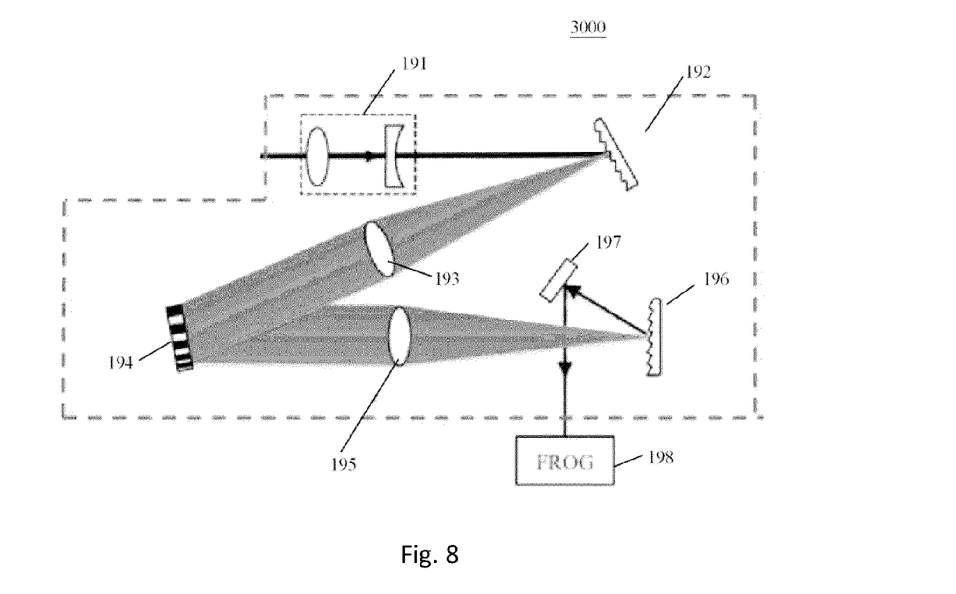
FIG. 8 illustrates the one dimensional DMD Based Pulse-shaping (DBP) System according to one embodiment of the present application.

FIG. 8 illustrates the DBP system 200 according to one embodiment of the present application. As shown, the DBP system 200 comprises a beam diameter regulator 191 and a first grating 192 and a deformable dispersion unit 194. The regulator 191 may be Galilean telescope and located in a beam receiving path. The regulator 191 is configured to adjust the diameter of the beam received in the beam path. For example, it can resize (e.g. expands) the beam diameter from the laser source to fit the dimension of the grating 192 and deformable dispersion unit 194 which will be discussed later.

The first dispersion unit 192 is located in the beam receiving path from the regulator 191 and separates the spectral components from the laser source so as to make the separated the spectral components transmit out with different emergent angles. In one embodiment, the first dispersion unit may be formed as a grating.

The focusing unit (for example, a cylindrical lens) 193 is located in the beam path from the first grating 192 and is configured to collimate the spectral components of the beam with different emergent angles into a parallel laser beam. In addition, the cylindrical lens 193 performs a Fourier transform which converts the angular dispersion from the grating 192 to spatial separation at its back focal plane.

The deformable dispersion unit 194 is purposely placed on this plane in order to manipulate the spatially dispersed spectral components. Similar to the deformable dispersion unit 130, each of the micromirrors has at least one pixel, and laser intensity in each pixel is controllable by changing a switching (on-off) rate of each pixel, allowing more complex beam intensity profile to be engineered. In addition, a switching speed of each pixel in individual micromirror in the deformable dispersion unit is controllable to arbitrarily adjust an intensity profile across laser patterns formed by the deformable dispersion unit.

After the deformable dispersion unit 194, a second cylindrical lens 195 is located in the beam path and is used to focus different spectral components back to the second grating 196.

A second dispersion unit 196 is located the focal plane of the lens and recombines all the spectral components into a single collimated beam, and a re-shaped output pulse is obtained, with the output pulse shape defined by the Fourier transform of the patterned programmed by the DMD 194 onto the spectrum. In one embodiment, the second dispersion unit may be formed as a grating.

A focusing unit (for example, cylindrical lens) 197 is positioned in the transmission path of the beam from the second grating 196 and reflects the beam to the desired direct or path. The reflected beam that will be sent out of the DBP System 190 shall have the capability to control the shape of the laser pulse by controlling the intensity and phase of each individual spectral component in the pulse.

Selectively or preferably, a Frequency Resolved Optical Gating (FROG) 198 may be used to simultaneously measure the pulse duration and the phase.

The ultrashort pulse from the laser source can be expressed as Equation 1. After the DBP 190, the output pulse can be expressed as Equation 2. In this equation, M($\omega$) is a function of frequency ($\omega$) to describe the DMD modulation. Mathematically, the M($\omega$) can be expressed as Equation 3. The three terms in Equation 3 represent the −1st order, 0th order and +1st order of the DMD, which are all spatially separated. Spatial filters can be applied to select orders. Conjugated phase modulation information of the DMD 194 are respectively carried by the −1st order and +1st order pulses.

$$E(t) = \frac{1}{2\pi} \int \tilde{E}(\omega) \exp(i\omega t) d\omega \qquad \text{(Equation 1)}$$

$$E(t) = \frac{1}{2\pi} \int \tilde{E}(\omega) M(\omega) \exp(i\omega t) d\omega \qquad \text{(Equation 2)}$$

$$M(\omega) = \frac{1}{2} + \frac{1}{2}[\exp(i\varphi) + \exp(-i\varphi)] \qquad \text{(Equation 3)}$$

As the DMD 194 can change its two-dimension patterns at 8 kHz or even higher speed, it enables the DBP system to modulate the phase at the same speed.

Figure 9:
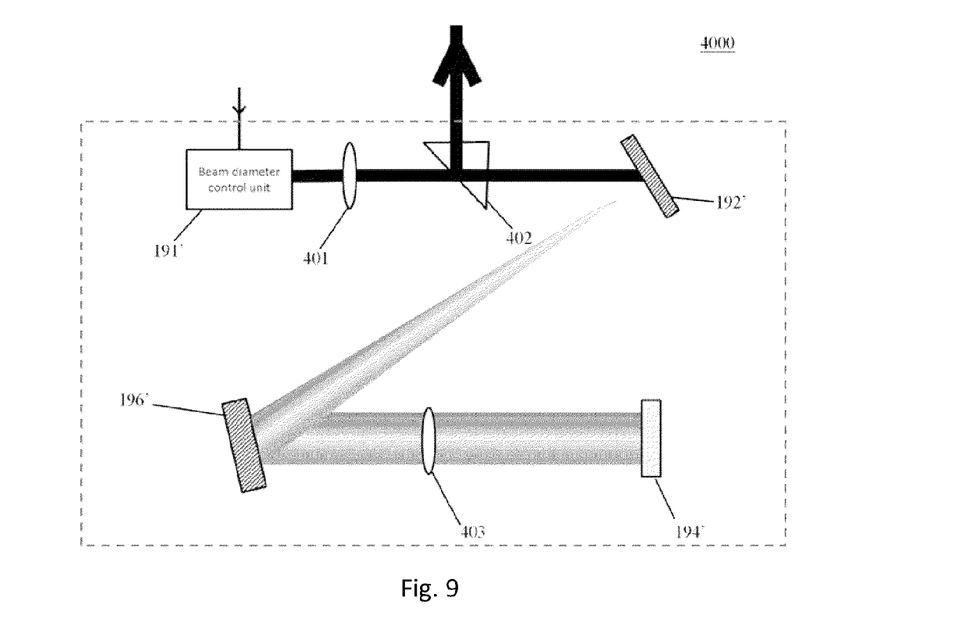
FIG. 9 illustrates the two dimensional DBP System according to further embodiment of the present application.

FIG. 9 is a schematic block view for the 2 dimensional DMD based pulse shaping system (DBP) 4000 according to a further embodiment of the present application. As Shown in FIG. 9, the DBP 4000 comprises a beam diameter control unit 191', a lens 401, a beam picker 402, a first dispersion component 192', a second grating 196', a lens 403 and a DMD 2D modulation 194'.

The beam diameter control unit 191' is similar to the regulator 191 as shown in FIG. 8 and is configured to adjust the diameter of the beam received in the beam path.

The focusing unit 401 is used to focus the laser beam. The focusing unit 401 may be formed as lens as shown, for example.

The beam picker 402 is used to pick up the laser beam after the laser beam was modulated and reflected by the DMD.

The first dispersion component 192' having a micro- or nano-structure used to separate different spectral components in one dimension (e.g. X direction). In one embodiment of the present application, the dispersion component 192' may be also configured with a grating structure.

The second dispersion component 196' having a micro- or nano-structure used to separate different spectral components in the second dimension (e.g. Y direction) so as to achieve two-dimensional pulse shaping. In one embodiment of the present application, the dispersion component 196' may be also configured with a grating structure.

The focusing unit 403 is used to collimate the dispersed laser beam. The focusing unit 403 may be formed as lens as shown, for example.

The modulation unit 194' is used to modulate different spectral components at the Fourier plane of the laser pulse.

Figure 10:
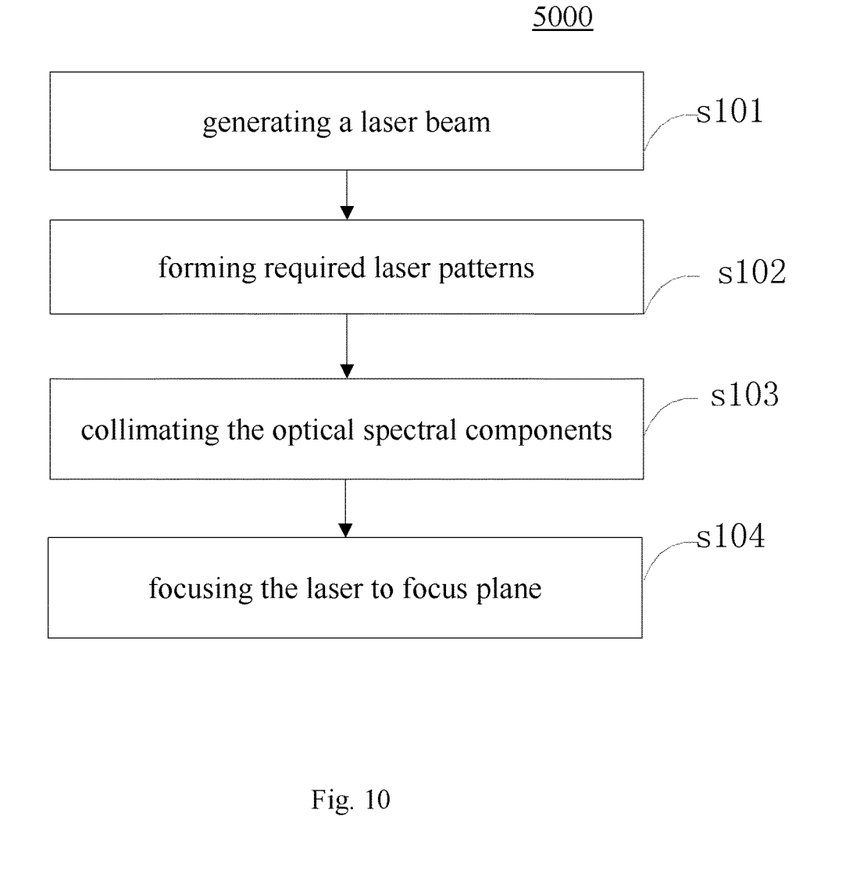
FIG. 10 is a schematic flow chat illustrating the laser manufacturing method according to an embodiment of the present application.

Hereinafter, the laser manufacturing method 5000 consistent with some disclosed embodiments will be discussed in reference to FIG. 10.

At step s101, a laser beam is generated. As discussed in the above, the laser beam may be generated by a pulse laser or a regenerative laser amplifier with a predetermined center wavelength. As well known in the art, the conventional regen laser amp usually outputs the laser with the wavelength of 800 nm. The output frequency for the laser beam maybe doubled or tripled by using second/third harmonic optical kit, but the overall power can be reduced substantially. For working with metals, ceramics, semiconductors, or some non-transparent materials, the generated laser shall have a low repetition rate and ultrashort pulse width. For example, the generated laser may have a repetition rate of 1-10 kHz with 100 fs pulse width and 4 W average powers. With these properties, the generated laser is capable of avoiding the heat accumulation.

At step s102, an emergent angle of the laser beam will be adjusted. A pair of HRs may be arranged in the propagation path of the laser and reflects the laser beam to a deformable dispersion unit. The two HRs are used to control the incident angle of the laser beam with respect to the deformable dispersion unit. The incident angle is critical as it determines the diffraction order of laser beam to be used in the fabrication progress.

At step s103, the required laser patterns will be formed from the laser in response to the adjusted incident angle to the deformable dispersion unit (or emergent angle from the HRs), and the laser patterns have spatially separated optical spectral laser components with a plurality of propagation angles. As discussed, the deformable dispersion unit may comprise a DMD with the programmable micromirror array. The laser patterns are formed by the programmable micromirror array, which can be arbitrarily specified by an end user. Each micromirror has a very small size (for example, 7 to 10 micron in size) and can be individually controlled to rotate so as to reflect (or direct) light with required emergent angle. For example, the array of micromirrors is fixed on hidden yokes. The yoke is connected to a reverse hinge structure to allow the micromirror to be rotated at a determined degree, so as to enable the micromirror array to manipulate the spectral components in the laser pulses and thus to enable the micromirror array 1301 to form arbitrary patterns.

In addition, in the step s103, the deformable dispersion unit may be used for precision beam-shaping and simultaneously used as a programmable photomask and a diffraction grating. In this approach, the laser spot will be projected onto the deformable dispersion unit and the intensity in each pixel can then be precisely controlled by changing the on-off rate (switching rate) of each pixel in the micromirror, which has a bandwidth of 8 kHz (or higher). Accordingly, this method allows more complex beam intensity profile to be engineered.

At step s104, the optical spectral components formed in step s103 are collimated into a parallel laser beam. After the DMD, the laser spectrum is spatially dispersed to different propagation angles and then transmits to a concave mirror. The concave mirror having an adjustable or fixed focus then may collimate the optical spectral components with different angles of departure into a parallel laser beam.

At step s105, an objective lens located in the propagation path of the parallel laser beam may be used to focus the laser with the pattern formed in step 103 to the focal plane so as to pattern one or more samples located in the focal plane of the lens. The objective lens recombines these components. The duration of laser pulses are varied along its propagation direction after the focusing lens. As the energy contained in each pulse is constant, when the pulse duration varied along the propagation direction, the peak power of the laser pulse will be varied. As a result, only at the focal plane, the highest peak power will be achieved and thus enables 3-D resolved direct area patterning Temporal focusing is thus achieved at the focal plane of the objective lens as a thin light sheet (for example, 3-5 µm). The spectral components diverge again after leaving the objective's focal plane. In other words, ultrashort pulses only retain the narrow 100 fs pulse width at the focal plane of the objective lens and broadened everywhere else (that is, the duration of laser pulses are varied along its propagation direction after the focusing lens), thereby achieving depth discrimination. To be specific, only a thin light sheet will meet the requirement that the peak power exceeds the fabrication threshold; then, only materials in this light sheet will be patterned. Hence, the fabrication is depth resolved. Since patterning resolution highly depends on the numerical aperture (NA) of the objective lens, a 40× long working distance water immersion objective lens is used (for example, an objective lens with NA=1.15 and WD=0.6 mm) for high resolution patterning. For large field patterning, a 25× long working distance water immersion lens will be used (for example, an objective lens with NA=1.1 and WD=2 mm).

The resolution limit can be enhanced by controlling the ablation threshold for direct area patterning. Sub-diffraction patterning can be achieved by precisely controlling the incident power intensity profile. The key is to control it over a large patterning area with good uniformity. The ablation threshold values are different for different materials. Laser intensity profile may be precisely adjusted at different regions through DMD to achieve optimal resolution over the entire patterning area. The DMD may control the scanning rate of individual micromirrors in the DMD to adjust intensity of the laser forming the patterns. To this end, in the method 5000, the GVD control unit 112 having an electrical controllable dispersive optical unit or array can be used to spatially adjust the level of dispersion (i.e. relative optical path difference and phase of the incoming laser beam). Through controlling the GVD, the location of focal plane (where all frequency components meet after object lens 150) can be controlled along the optical axis. Using this approach, high speed Z positioning of the sample can be achieved without the need of a mechanical stage, which is slow and comes with unwanted dynamics.

To observe the laser machining process in real time, a microscopic imaging system may be built in conjunction with the manufacturing station. The method may further comprise arranging a microscopic imaging system in the path of beam for observing the laser machining process in real time.

As well known in the art, the generated laser beam comprises two perpendicular polarization components. In one embodiment of the present application, a half-wave plate may be positioned in the in a laser receiving orientation from the laser source and shift phase between two perpendicular polarization components so as to retards one polarization of the two perpendicular polarization components by half a wavelength of the laser.

A polarization beam splitter may be also located in the propagation path of the laser received from the half-wave plate, wherein the polarization beam splitter splits the laser received from the half-wave plate into two laser beams, one is transmitted to the reflectance mirror, and the other one is used for monitoring the pulse duration and quality of the generated beam.

Figure 11:
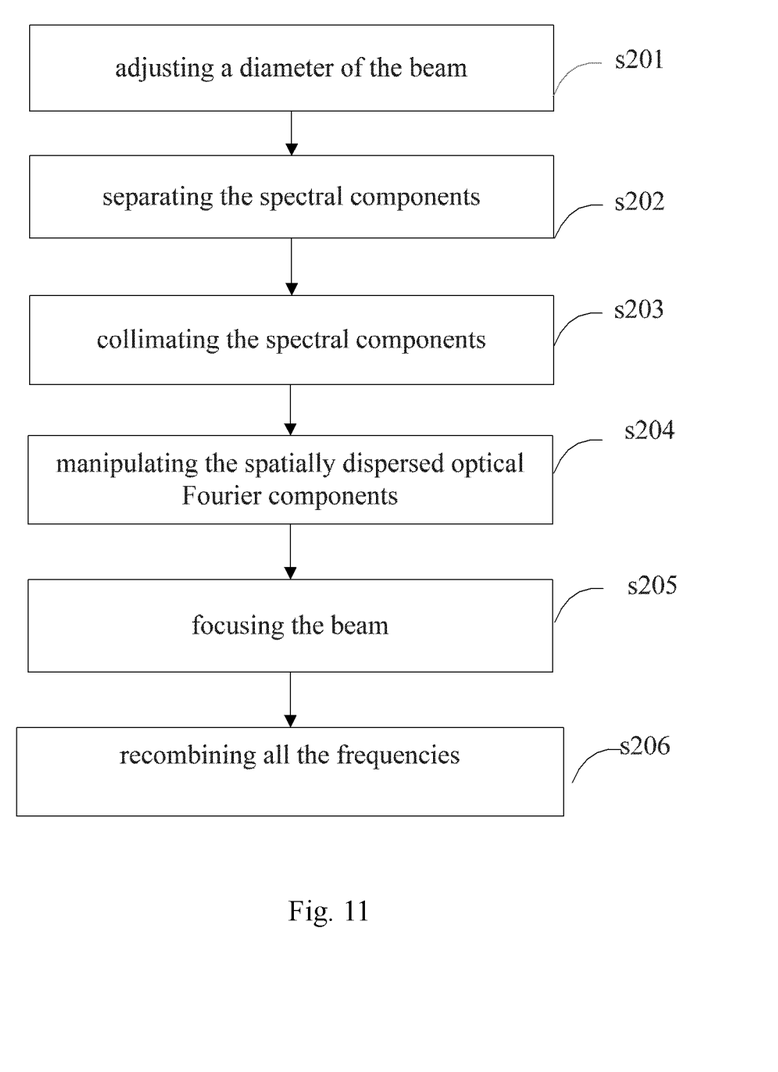
FIG. 11 illustrates the flow chat for shaping the generated laser pulse by a DBP system before the beam is sent to the DMD according to one embodiment of the present application.

The method 5000 consistent with some disclosed embodiments may further comprise a step of shaping the generated laser beam by a DBP system before the beam is sent to the DMD. As shown in FIG. 11, the step of shaping starts at step 201, in which the diameter of the beam received in the beam path will be adjusted. In one embodiment of the present application, the DBP system may uses a Galilean telescope located in a beam receiving path to adjust the diameter of the beam received in the beam path. For example, it can resize (e.g. expands) the beam diameter from the laser source to fit the dimension of the grating and DMD as discussed later.

At step 202, the method separates the spectral components from the laser source so as to make the separated spectral components transmit out with different emergent angles. For example, an optical grating may be located in the beam receiving path and separates the spectral components from the laser source so as to make the separated the spectral components transmit out with different emergent angles.

At step 203, the spectral components of the beam with different emergent angles are collimated into a parallel laser beam. In addition, a Fourier transform will be and performed to convert the separated spectral components with different emergent angles (angular dispersion) to a plurality of spatially and spectrally dispersed optical components.

At step s204, it manipulates the spatially dispersed optical components to form arbitrary patterns of the laser. As discussed in the above, a DMD may be purposely placed on a back focal plane of the grating in order to manipulate the spatially dispersed optical components. The pixels of micromirror array of the DMD may be controlled to rotate in response to changing of the incident angle of the received beam, so as to enables the micromirror array to form arbitrary patterns.

At step s205, a second cylindrical lens (195) located in the beam path and is used to focus different spectral components of the laser pulse to the second grating.

At step s206, a second grating located at the focal plane of the lens may be used to recombine all the frequencies into a single collimated beam, and a re-shaped output pulse is obtained, with the output pulse shape defined by the Fourier transform of the patterns programmed by the DMD onto the spectrum. In other words, the shape of the output pulse can be adjusted with the patterns on the DMD. A lens positioned in the transmission path of the beam may be used to focus different spectrum components to the second grating.

Figure 12:
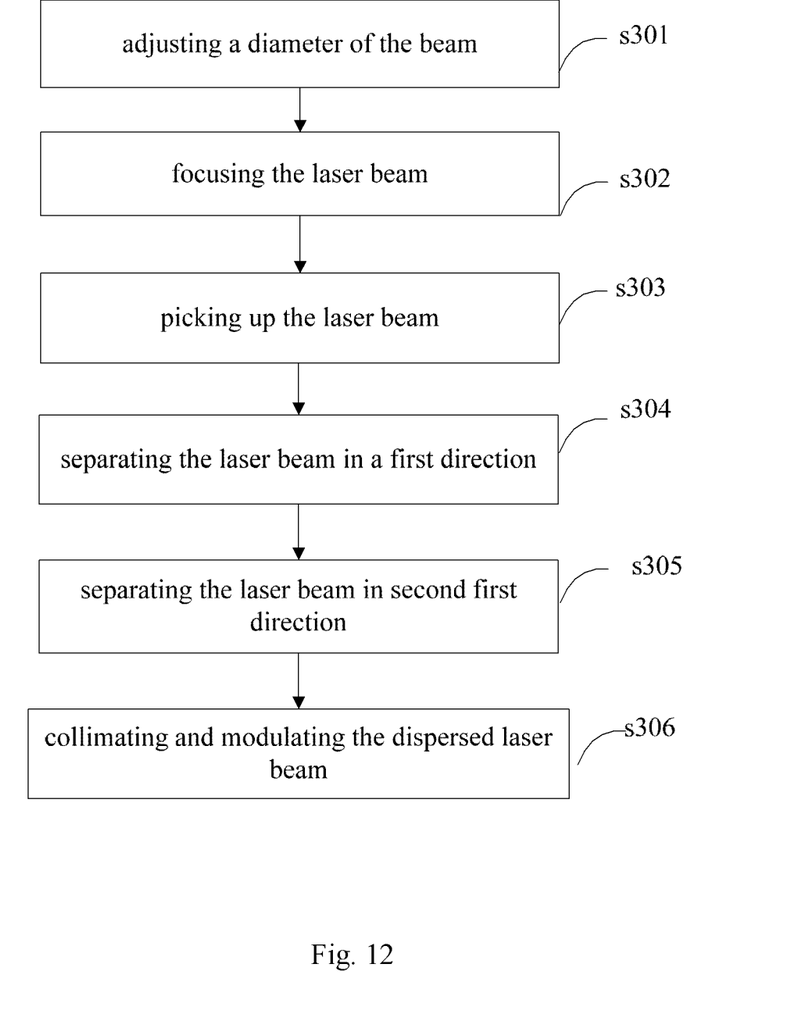
FIG. 12 illustrates the flow chat for shaping the generated laser pulse by a DBP system before the beam is sent to the DMD according to another embodiment of the present application.

FIG. 12 illustrates the flow chat for shaping the generated laser pulse by a DBP system before the beam is sent to the DMD according to another embodiment of the present application.

As step s301, the diameter of the beam received in the beam path will be adjusted. In one embodiment of the present application, the DBP system may uses a Galilean telescope located in a beam receiving path to adjust the diameter of the beam received in the beam path. For example, it can resize (e.g. expands) the beam diameter from the laser source to fit the dimension of the grating and DMD as discussed later.

At step s302, a lens is used to focus the laser beam with the adjusted diameter into a focal plane of the lens. At step s303, a beam picker positioned in a focal plane of the lens operates to pick up the laser beam.

At step s304, a first dispersion unit having a grating structure may be utilized to separate the laser beam into different spectral components in a first direction (for example, x-direction), and at step s305, a second dispersion unit having a grating structure may be utilized to separate the different spectral components in a second direction (for example, y-direction) so as to achieve two-dimensional pulse shaping of the laser beam.

And then, at step s306, a lens optically coupled to the second dispersion unit may be used to collimate the dispersed laser beam, such that the modulation unit optically coupled to the second lens can modulate different spectral components at a Fourier plane of the laser pulse at step.

The corresponding structures, materials, acts, and equivalents of all means or step plus function units in the claims below are intended to include any structure, material, or act for performing the function in combination with other claimed units as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A laser-based manufacturing system, comprising:
a laser source generating a pulsed laser beam;
a reflectance mirror arranged in a propagation path of the laser to reflect the laser, the mirror being controllable to adjust an emergent angle of the laser;
a deformable dispersion unit located in a laser receiving path from the reflectance mirror and having an array of micromirrors controllable in response to the adjusted emergent angle to form required laser patterns from the reflected laser, the laser patterns having spatially separated optical spectral components with a plurality of propagation angles;
one or more focusing units positioned in a propagation path of the separated optical spectral components produced by the deformable dispersion unit, the focusing units recombine the optical spectral components on or inside fabrication targets; and
a DBP System positioned between the laser source and the reflectance mirror to shape pulses of the generated pulsed laser beam, the DBP System comprising:
a beam diameter regulator located in a beam receiving path and configured to adjust a diameter of the beam received in the beam receiving path;
a first dispersion unit located in the beam receiving path and separating the spectral components from the adjusted laser to make the separated spectral components transmit out with different emergent angles;
a first focusing unit located in a beam path from the first dispersion unit and configured to collimate the spectral components of the beam with different emergent angles into a parallel laser beam and to convert the separated spectral components with different emergent angles (angular dispersion) to a plurality of spatially dispersed spectral components at a back focal plane of the first focusing unit;
a modulating unit positioned on the back focal plane to form arbitrary patterns of the laser from the spatially and spectrally dispersed optical components; and
a second focusing unit located in the beam path and is used to combine different spectral components back to a second dispersion unit positioned at a focal plane of the second focusing unit, wherein the second dispersion unit recombines all the spectral components into a single collimated beam, obtaining a re-shaped pulsed laser beam.

2. The system of claim 1, wherein the focusing units comprise:
a first focusing unit positioned in the propagation path of the separated optical spectral components and having a focal length that is able to collimate the optical spectral components into a parallel laser beam; and
a second focusing unit optically coupled to the fist focusing unit and having a focal length to focus the laser to pattern one or more samples located on a focal plane of the second focusing unit.

3. The system of claim 1, wherein the deformable dispersion unit is configured to function as at least one selected from a group consisting of:
a photomask with grating structures,
a shaped transmission or reflectance grating,
a digital micromirror device (DMD);
a microelectromechanical system (MEMS) mirror array.

4. The system of claim 1, wherein each of the micromirrors has at least one pixel, and laser intensity in each pixel is controllable by changing a switching (on-off) rate of each pixel.

5. The system of claim 4, wherein a switching speed of each pixel in individual micromirror in the deformable dispersion unit is controllable to arbitrarily adjust an intensity profile across laser patterns formed by the deformable dispersion unit.

6. The system of claim 1, further comprising:
a GVD controller having a dispersive optical unit or array electrically configurable to spatially adjust a dispersion level for said spatially separated optical spectral components, so as to control a location of a focal plane where all optical spectral components meet along their optical axis.

7. The system of claim 6, wherein the dispersive optical unit adjusts a relative optical path difference and a phase of the laser beam to adjust said dispersion level.

8. The system of claim 1, wherein, the focusing units are configured with a focal length re-configurable to make a duration of laser pulses vary along its propagation direction after the focal units.

9. The system of claim 2, wherein, the second focusing unit has a focus re-configurable to scan the required patterns formed by the deformable dispersion unit along its propagation direction after the second focusing unit.

10. The system of claim 2, wherein said focusing units comprise one or more selected from a group consisting of a concave reflectance mirror, or focus tunable focusing unit, or an objective, or a combination thereof such that the dispersed optical spectral components are recombined at said focal plane.

11. The system of claim 2, further comprising:
A XYZ stage holding the fabrication targets, the fabrication targets being located at the focal plane.

12. The system of claim 1, further comprising a microscopic imaging system positioned in the propagation path of beam for observing a laser machining process in real time.

13. The system of claim 1, wherein the generated laser beam comprises two perpendicular polarization components, and the system further comprises:
a half-wave plate positioned in a laser receiving orientation from the laser source and shifting phases between two perpendicular polarization components so as to retard one polarization of the two perpendicular polarization components by half a wavelength of the laser.

14. The system of claim 13, further comprising:
a polarization beam splitter located in a propagation path of the laser received from the half-wave plate, wherein the polarization beam splitter splits the laser received from the half-wave plate into two laser beams, one is reflected to the reflectance mirror, and the other one is transmitted for monitoring a quality of the generated beam.

15. The system of claim 14, further comprising:
a shutter positioned in a propagation path of reflected beam for switching on/off the laser propagation path.

16. A laser manufacturing method, comprising:
generating a pulsed laser beam;
shaping the generated laser beam by a DBP system, comprising:
adjusting a diameter of the beam received in a beam path;
separating spectral components from the laser source to make the separated spectral components transmit out with different emergent angles;
collimating the spectral components of the beam with different emergent angles into a parallel laser beam and converting the separated spectral components with different emergent angles (angular dispersion) to a plurality of spatially dispersed spectral components;
forming arbitrary patterns of the laser from the spatially and spectrally dispersed optical components; and
recombining all the spectral components into a single collimated beam to obtain a re-shaped pulsed laser beam; and
adjusting an emergent angle of the re-shaped pulsed laser beam;
forming required laser patterns from the pulsed laser beam in response to the adjusted emergent angle, the laser patterns having spatially separated optical spectral components with a plurality of propagation angles;
collimating the optical spectral components into a parallel laser beam; and
focusing the parallel laser beam to a light sheet at a focal plane to pattern one or more samples located on the focal plane.

17. The method of claim 16, wherein forming required laser patterns comprises:
forming required laser pattern in a DMD comprising an array of controllable micromirrors, wherein each of the micromirrors has at least one pixel,
wherein the focusing further comprises:
changing a switching (on-off) rate of each pixel to control a laser intensity in each pixel.

18. The method of claim 17, wherein a switching speed of each pixel in individual micromirror in the deformable dispersion unit is controllable to arbitrarily adjust an intensity profile across laser patterns formed by the deformable dispersion unit.

19. The method of claim 16, further comprising:
adjusting spatially a dispersion level for said optical spectral components, so as to control a location of focal plane where all the optical spectral components meet along their optical axis.

20. The method of claim 19, wherein the adjusting further comprises:
adjusting a relative optical path difference and a phase of the laser beam to adjust said dispersion level.

21. The method of claim 16, further comprising:
observing a laser machining process in real time through a microscopic imaging system in a path of beam.

22. The method of claim 16 wherein, the generated laser beam comprises two perpendicular polarization components, and wherein, before the adjusting, the method further comprises:

shifting phases between two perpendicular polarization components to retard one polarization of the two perpendicular polarization components by half a wavelength of the laser.

\* \* \* \* \*